July 15, 1924.

T. MIDGLEY, JR

ANILINE INJECTOR

Filed Oct. 15, 1920

Witnesses
L. Hale Emrick
Spencer F. Hunt

Inventor
Thomas Midgley Jr.
By Kerr, Page, Cooper + Hayward
Attorneys

July 15, 1924.
T. MIDGLEY, JR
1,501,568
ANILINE INJECTOR
Filed Oct. 15, 1920
2 Sheets-Sheet 2
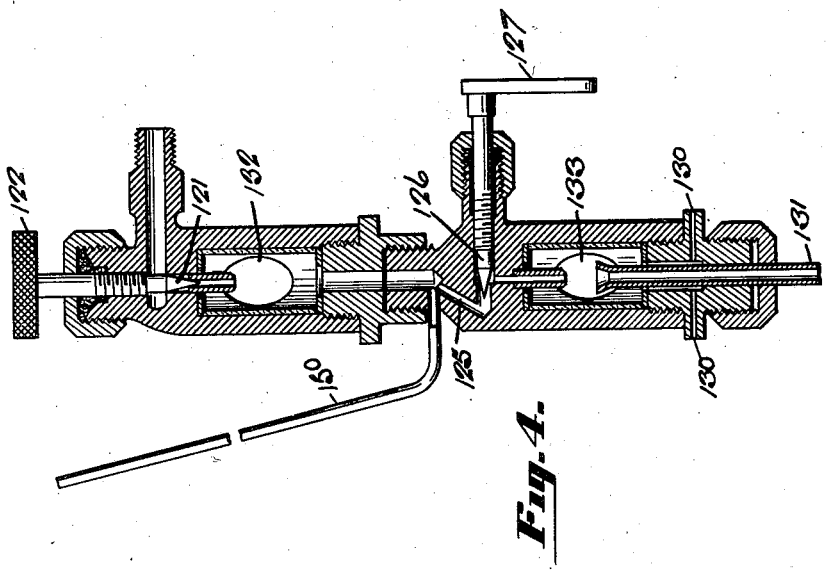
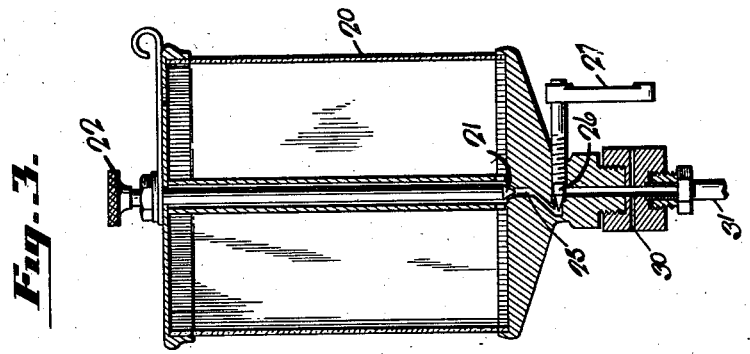

Patented July 15, 1924.

1,501,568

UNITED STATES PATENT OFFICE.

THOMAS MIDGLEY, JR., OF DAYTON, OHIO, ASSIGNOR TO GENERAL MOTORS RESEARCH CORPORATION, OF DAYTON, OHIO, A CORPORATION OF DELAWARE.

ANILINE INJECTOR.

Application filed October 15, 1920. Serial No. 417,162.

*To all whom it may concern:*

Be it known that I, THOMAS MIDGLEY, Jr., a citizen of the United States of America, residing at Dayton, county of Montgomery, and State of Ohio, have invented certain new and useful Improvements in Aniline Injectors, of which the following is a full, clear, and exact description.

The present invention relates to the process of preventing "knocking" or "pinking" taking place in internal combustion engines under certain conditions, frequently referred to as due to premature firing of the fuel mixture; and to apparatus suitable for carrying out the process.

In application, Serial No. 281,741, filed March 10th, 1919, by Charles F. Kettering and Thomas Midgley, jr., there are set out certain facts, discovered by the applicants concerning this knocking. These facts demonstrate that knocking is not due to premature firing but is a function of the fuel used.

As stated in the said application, such fuel as is commonly used in internal combustion engines has what has been designated as "critical compression pressure". That is, when a fuel is used in internal combustion engines, there is an engine compression pressure which cannot be exceeded without the development of the knocking or pinking. If the compression pressure of the engine exceeds the critical compression of the fuel, the knock will always develop. The said application also indicates that the critical compression pressure of a given fuel may be raised by having present therein during combustion of the fuel a small amount of one or more of certain substances, themselves not necessarily fuels, and called "anti-knock" compounds or substances in the specification. The preferred method of accomplishing this result is by dissolving these substances in a fuel such as kerosene or gasoline. Among the anti-knock substances mentioned in said copending application are aniline, xylidine, their homologues and pseudo-homologues, ethyl iodine, iodine, etc.

It has now been discovered that the prevention of knock may be accomplished not only by dissolving such substances in the fuel but by mixing them with the fuel mixture at any period before combustion takes place.

This addition of the anti-knock materials to the fuel is accomplished preferably by the injection or atomization of the materials into the current of fuel and air flowing through the intake manifold of the engine, although the desired result may be accomplished by injecting the anti-knock material into the combustion chamber immediately before combustion takes place.

One of the principal advantages of this method over that of adding the anti-knock to the liquid fuel in the tank is that the addition need only be made under certain conditions.

With ordinary fuels, and operating under ordinary conditions, the knock usually will not be continual but will occur only under certain circumstances. Anti-knock material, therefore, is needed only at such times. It naturally follows that, by using anti-knock material only when needed, considerable saving is effected. In fact, by using this process the amount of anti-knock material usually sufficient to prevent knock is only a small proportion of the amount used when dissolving it in the fuel prior to or after the fuel has been placed in the fuel reservoir.

Another advantage lies in the fact that by following the present method, no precautions have to be taken to insure that the anti-knock material remains in solution. With some of the materials used, no difficulty is experienced in the dissolving or the retaining in solution of the materials in the fuel, but with others there is considerable difficulty, especially in cold weather.

The condition under which the fuel knock usually occurs when using the grade of fuel gasoline most readily obtained at the present time, is when there is a low vacuum in the intake manifold, as at such times the compression pressure of the engine is greatest and approaches the calculated compression pressure. Most of the present day automobile engines are designed to give a compression pressure of about seventy pounds per square inch while the ordinary fuels have a critical compression of between fifty and sixty pounds, so that in such engines it is only at times when the vacuum in the intake manifold is low that the compression pressure exceeds the critical compression of the fuel. Accordingly in the present process, addition of the anti-knock material to the fuel mixture is made at such times.

The process is readily carried out by using an apparatus such as is described and shown herein although it should be noted that the process is not limited to the specific form of apparatus but may be carried out with other suitable forms.

Further objects and advantages of the present invention will be apparent from the following description, reference being had to the accompanying drawings wherein preferred embodiments of the present invention are clearly illustrated.

In the drawings:

Fig. 3 is a vertical section through the injector and its control valve shown in Fig. 1.

Fig. 4 is a vertical section of the injector shown in Fig. 2.

Figure 1:
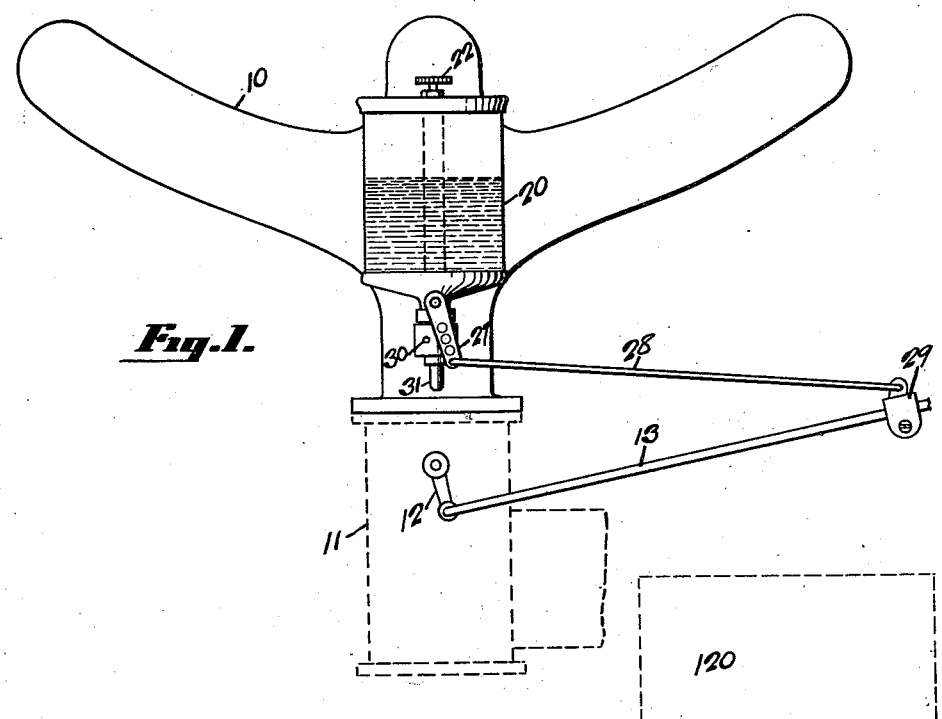
Fig. 1 is an elevation of one form of anti-knock injector showing the means for regulation and illustrated as being attached to the intake manifold.

In the drawings, 10 is a conventional representation of the intake manifold of a multi-cylinder internal-combustion engine, while 11 is a conventional representation of a carburetor for supplying fuel-air mixture to the engine. The usual throttle valve and operating lever for controlling the entrance of fuel-air mixture to the engine is indicated by the numeral 12. This operating lever is attached to rod 13 extending through suitable connections to the fuel regulating lever (not shown) upon the steering wheel.

The injector consists of a tank for containing the supply of anti-knock material, a suitable regulating valve, means for admitting air for atomization of the anti-knock material, means for operating the valve, and a conduit leading to the engine.

In the form of injector shown in Figs. 1 and 3, the supply tank is designated by numeral 20 and consists of a container of suitable size, having a cut-off valve 21 suitably located in its bottom and controlled by a knurled portion 22, so that the injector may be rendered inoperative when desirable. The base of the container 20 also carries a passage-way 25, controlled by means of valve 26 operated by a suitable lever 27. The lever 27 is connected by a rod 28 to the throttle control rod 13 in any suitable fashion, as by means of the clamp 29.

Leading into the passage-way 25 below valve 26 are one or more air passages 30 for admitting, along with the anti-knock material a small amount of air which serves to atomize or finely divide the anti-knock material into the form of a spray which readily mixes with the passing current of fuel and air mixture in the intake manifold. This mixture of anti-knock material and air flows from passage-way 25 through a pipe 31 into the intake manifold.

Figure 2:
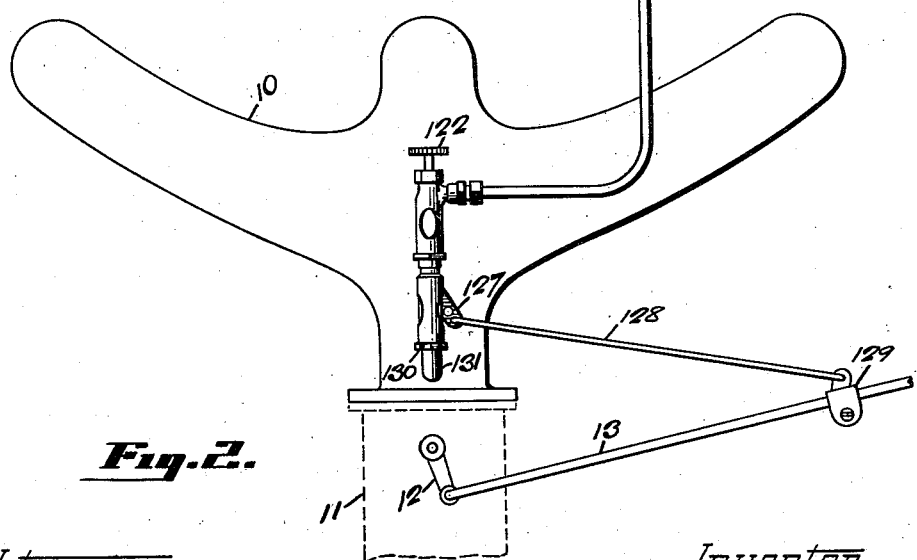
Fig. 2 is an elevation of a second form of injector.

The form of injector shown in Fig. 2 corresponds to the form shown in Figs. 1 and 3, but is provided with a sight feed which enables the operation of the device to be more easily controlled.

In Fig. 4 there is shown a vertical section of such an injector with an additional element which will be hereinafter described.

In this form of injector the supply tank is indicated at 120 in Fig. 2, the cut-off valve at 121, and its knurled head at 122. The other parts corresponding to similar parts in Figs. 1 and 3 are the passage-way 125, the regulating valve 126 with its operating lever 127, the air inlets 130 and the pipe 131 leading to the intake manifold. The regulating valve is controlled through rod 28 connected to throttle control rod 13 by a clamp 129, as in the first described form of indicator.

This second form of indicator, however, differs from the first form in that it is supplied with a sight feed tube 132 and in that the air inlets admit air to a second sight feed tube 133 where it enters tube 131 along with anti-knock material dropped from the lower end of passage-way 125.

The operation of this form of injector is substantially the same as the operation of the first form and will be described below.

The form of injector shown in Fig. 4 is provided with an additional tube 150 which leads into the passage-way 125 above the regulating valve 126, and which is open at its upper end and extends substantially to the level of liquid in supply tank 120.

The operation of the injectors is as follows:

As stated above, the knock usually occurs when the vacuum in the intake manifold is low. This low vacuum generally accompanies the opening of the throttle valve for fuel. It is at such times that the injection of anti-knock material usually becomes necessary. Accordingly the regulating valves 26 and 126 are coupled to the rod which operates the throttle valve and the operating arms 27 and 127. These valves are preferably so positioned that a slight movement of the throttle valve does not open the valves 26 and 126 to such an extent as to allow the anti-knock material to flow into the intake manifold. When, however, the throttle valve is open to a greater degree the regulating valves 26 and 126 are also open sufficiently to allow a flow of a quantity of anti-knock material corresponding to the amount of fuel entering the engine, and this amount is regulated to be just sufficient to prevent the knock.

Instead of providing the clamp 29 of the form shown in the drawings, this clamp may be so made as to allow the throttle control rod 13 to move a small distance before any motion is imparted to the rod 28. This is in order that the valve 26 may remain entirely closed in ordinary running position of the throttle 12. In such cases it will be advisable to attach a small spring to arm 27 to retain the valve 26 in closed position until operated by the clamp 29.

To provide for a sudden opening of the throttle, such as in very quick acceleration from low speeds and such other times that it may be necessary to open the throttle quickly, there is provided a means for allowing the accumulation of a small amount of anti-knock material in the injector such as is shown in Fig. 4. This means is a small standpipe or manometer tube 150. As will readily be seen when the valve 126 is closed, without closing valve 121, the anti-knock material will continue to drip into the sight feed chamber 132 and will run into pipe 150 until the hydrostatic pressure in this tube just balances the hydrostatic pressure through the supply tube. Accordingly, when the valve 126 is opened suddenly after remaining in closed position for some time, the immediate injection of a considerable quantity or slug of the anti-knock material will take place.

It should be noted that wherever the expressions "low" vacuum and "high" vacuum occur in the specification and claims, these refer to the vacuums corresponding to low and high columns of mercury respectively. That is, a "low" vacuum is one which is sufficient to lift a column of mercury only a short distance while a "high" vacuum is one which will lift a column to a greater height.

While only those anti-knock materials have been mentioned in this application which were mentioned in the prior application before referred to, nevertheless it is contemplated that any anti-knock material may be used in the process, although the specific apparatus described is intended particularly for such anti-knock materials as may be converted to liquid form.

While the process and forms of mechanism herein shown and described, constitute preferred embodiments of the invention, it is to be understood that other forms might be adopted, all coming within the scope of the claims which follow.

What I claim is as follows:—

1. The process of preventing knock in internal-combustion engines which comprises adding aromatic hydrocarbon derivatives containing an $NH_2$ group to the fuel-air mixture only at such times as the actual compression pressure equals or exceeds the critical compression of the fuel.

2. The process of preventing knock in internal-combustion engines which comprises adding aniline to the fuel-air mixture only at such times as the actual compression pressure equals or exceeds the critical compression of the fuel.

3. The process of preventing knock in internal-combustion engines which comprises injecting aniline into the intake manifold of the engine only at such times as the actual compression pressure equals or exceeds the critical compression of the fuel.

4. The process of preventing knock in internal-combustion engines which comprises atomizing aniline into the fuel-air mixture only at such times as the actual compression pressure equals or exceeds the critical compression of the fuel and increasing the amount of aniline added as the compression pressure increases.

5. The process of preventing knock in internal combustion engines which comprises admitting to the fuel-air mixture an anti-knock material in a relatively small proportion when the actual compression pressure equals or exceeds the critical compression of the fuel; and controlling the flow of such material so as to admit a slug of a considerable quantity when the actual compression begins to exceed the critical compression of the fuel, then continuing the flow at a lower rate.

6. The process of operating an internal-combustion engine which comprises feeding a fuel to the engine; adding a knock suppressing substance to the fuel; initiating the addition of the substance by automatically adding a relatively large quantity thereof to the fuel; and burning the fuel in the engine in the presence of the substance.

7. The process of operating an internal-combustion engine which comprises feeding a fuel to the engine; feeding a knock suppressing substance to the engine; automatically increasing the quantity of substance supplied to above the normal feeding rate during a short period of engine operation; and burning the fuel in the engine.

8. The process of operating an internal-combustion engine adapted to operate at compressions above and below the critical compression pressure of the fuel used which comprises operating the engine at a low compression on the fuel without the addition thereto of a substance which prevents the fuel knock; operating the engine at a higher compression on the fuel while adding to the fuel a substance which prevents fuel knock; and initiating the addition of the substance to the fuel by adding thereto a relatively large quantity of the substance.

9. In a fuel feeding mechanism for internal-combustion engines the combination of a fuel conduit; of means for feeding a knock suppressing substance to the conduit; and instrumentalities for collecting a relatively large quantity of substance and for discharging said quantity at a higher rate than during normal operation of the feeding means.

10. In a fuel feeding mechanism for internal-combustion engines, the combination of means for forming a combustible fuel mixture; and means for adding to the fuel mixture during a part only of the period of engine operation a material adapted to prevent fuel knock, and for adding a relatively large quantity of material when the addition thereof is initiated.

In testimony whereof I hereto affix my signature.

THOMAS MIDGLEY, JR.

Witnesses:
ROBERT E. SMITH,
ALVINA C. LEHMAN.